(12) United States Patent
Chang et al.

(10) Patent No.: US 9,092,649 B2
(45) Date of Patent: Jul. 28, 2015

(54) DATA PROTECTING METHOD CAPABLE OF EFFECTIVELY RECORDING PROTECTION INFORMATION AND MEMORY USING THEREOF

(75) Inventors: Kuen-Long Chang, Taipei (TW); Nai-Ping Kuo, Hsinchu (TW); Ming-Chih Hsieh, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 1660 days.

(21) Appl. No.: 12/395,776

(22) Filed: Mar. 2, 2009

(65) Prior Publication Data
US 2010/0223439 A1    Sep. 2, 2010

(51) Int. Cl.
G06F 13/00    (2006.01)
G06F 21/79    (2013.01)
G06F 12/06    (2006.01)
G06F 12/02    (2006.01)
G06F 3/06    (2006.01)
G06F 13/42    (2006.01)

(52) U.S. Cl.
CPC ............ *G06F 21/79* (2013.01); *G06F 3/062* (2013.01); *G06F 3/0646* (2013.01); *G06F 3/0668* (2013.01); *G06F 3/0688* (2013.01); *G06F 12/0238* (2013.01); *G06F 12/0623* (2013.01); *G06F 13/4234* (2013.01)

(58) Field of Classification Search
CPC ..... G06F 3/062; G06F 3/0668; G06F 3/0646; G06F 3/0688; G06F 12/0238; G06F 12/0623; G06F 13/4234

USPC ............. 711/151, 154, 163; 710/23, 33, 310; 712/14, 27, 225; 713/151, 165; 714/6.2, 763, 773

See application file for complete search history.

(56) References Cited

U.S. PATENT DOCUMENTS

| | | | | |
|---|---|---|---|---|
| 5,802,583 | A | * | 9/1998 | Yeager et al. ................. 711/152 |
| 5,930,826 | A | * | 7/1999 | Lee et al. ....................... 711/163 |
| 6,731,536 | B1 | * | 5/2004 | McClain et al. ........... 365/185.04 |
| 7,224,602 | B2 | * | 5/2007 | Kido et al. ................ 365/185.04 |
| 2005/0157553 | A1 | * | 7/2005 | Perroni et al. ........... 365/185.11 |
| 2006/0155947 | A1 | * | 7/2006 | DeCaro ........................ 711/163 |
| 2007/0016741 | A1 | * | 1/2007 | DeCaro ........................ 711/163 |

FOREIGN PATENT DOCUMENTS

CN    1235133    1/2006

OTHER PUBLICATIONS

Chinese language office action dated Jun. 23, 2011.
English language translation of abstract of CN 1235133 (published Jan. 4, 2006).
TW Office Action dated Jun. 11, 2013.

* cited by examiner

*Primary Examiner* — Reba I Elmore
(74) *Attorney, Agent, or Firm* — McClure, Qualey & Rodack, LLP

(57) ABSTRACT

A data protecting method for a memory, which comprising a volatile memory and a non-volatile memory for storing data and data protection information, comprises the following steps. Firstly, load the data protection information to the volatile memory from the non-volatile memory. Next, protect the data stored in the memory according to the data protection information stored in the volatile memory.

13 Claims, 4 Drawing Sheets

DATA PROTECTING METHOD CAPABLE OF EFFECTIVELY RECORDING PROTECTION INFORMATION AND MEMORY USING THEREOF

BACKGROUND OF THE INVENTION

1. Field of the Invention

The invention relates in general to a data protecting method, and more particularly to a data protecting method for protecting data, stored in a memory array, according to protection information stored in a volatile memory.

2. Description of the Related Art

In the modern age, in which the technology changes with each passing day, non-volatile memories, such as flash memories, are widely used in various electronic products. Conventionally, a non-volatile memory is provided to store protection information so that modification protection may be performed on data stored in a flash memory. In some special occasions, however, the protection information stored in the non-volatile memory has to be rewritten at the high frequency. Thus, memory cells in the non-volatile memory may be damaged so that they cannot effectively record the protection information. Thus, it is an important direction in the industry to design a method of effectively recording the protection information.

SUMMARY OF THE INVENTION

The invention is directed to a data protecting method of protecting data, stored in a memory, according to protection information stored in a volatile memory. The protection information stored in the volatile memory is loaded from a non-volatile memory. Compared with the conventional protection method, the data protecting method of the invention has the advantages of effectively recording the protection information and preventing the non-volatile memory from being damaged due to the high frequency rewriting.

According to a first aspect of the present invention, a data protecting method of a memory, which includes a volatile memory and a non-volatile memory for storing data and data protection information, is provided. The data protecting method comprising the following steps. Firstly, the data protection information is loaded to the volatile memory. Next, the data stored in the memory is protected according to the data protection information stored in the volatile memory.

According to a second aspect of the present invention, a memory is provided. The memory includes a volatile memory, a non-volatile memory, and a control circuit. The non-volatile memory stores data and data protection information. The control circuit loads the data protection information to the volatile memory. The control circuit protects the data stored in the memory according to the data protection information stored in the volatile memory.

The invention will become apparent from the following detailed description of the preferred but non-limiting embodiments. The following description is made with reference to the accompanying drawings.

DETAILED DESCRIPTION OF THE INVENTION

Figure 1:
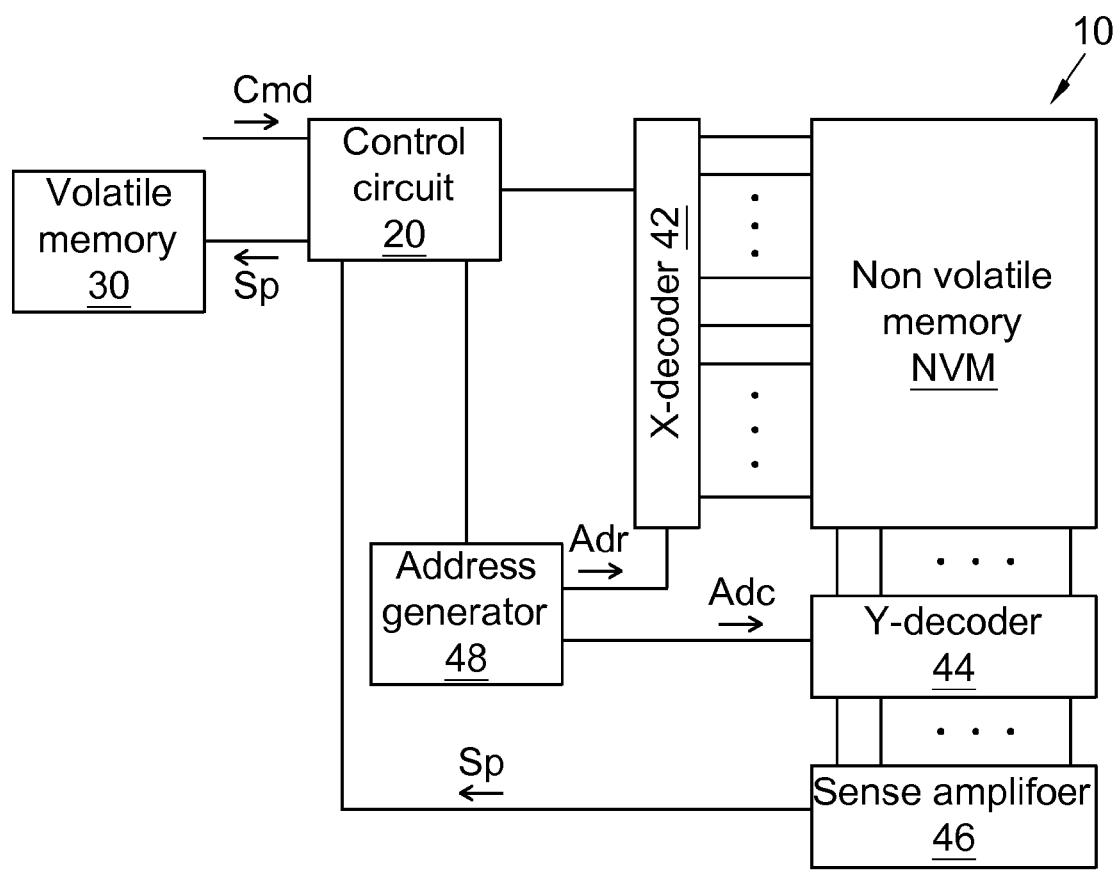
FIG. 1 is a block diagram showing a memory according to an embodiment of the invention.

FIG. 1 is a block diagram showing a memory 1 according to an embodiment of the invention. Referring to FIG. 1, the memory 1 includes a non-volatile memory NVM, a control circuit 20 and a volatile memory 30. The non-volatile memory NVM includes many memory sectors for storing corresponding data. The non-volatile memory NVM further stores data protection information Sp corresponding to the data stored in the non-volatile memory NVM.

In one example, the non-volatile memory NVM is implemented by a memory array 10, for example. The memory 1 further includes, for example, a row decoder (X-decoder) 42, a column decoder (Y-decoder) 44, a sense amplifier 46 and an address generator 48. The address generator 48 generates a row address signal Adr and a column address signal Adc for respectively driving the row decoder 42 and the column decoder 44 to enable the non-volatile memory NVM to provide corresponding current signals. The sense amplifier 46 senses the current signals to correspondingly output the data protection information Sp.

The control circuit 20 receives the data protection information Sp provided by the sense amplifier 46 and correspondingly loads the data protection information Sp into the volatile memory 30. In one example, the volatile memory 30 is implemented by, for example, a register in the memory 1.

The control circuit 20 further protects the data stored in the non-volatile memory NVM according to the data protection information Sp in the volatile memory 30. In one operation example, the control circuit 20 obtains that one specific memory sector in the non-volatile memory NVM is protected in response to the data protection information Sp. Thus, if the control circuit 20 receives a data change command, which indicates that a data change operation is performed on the specific memory sector being protected, then the control circuit 20 cannot perform the corresponding data change operation. In one example, the control circuit 20 further correspondingly triggers a protection operation event to notify the user that the specific memory sector is in a protected state.

Figure 2:
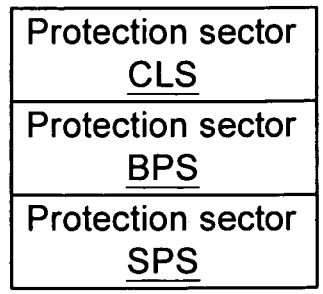
FIG. 2 is a detailed schematic illustration of protection sectors in a non-volatile memory NVM of FIG. 1.

FIG. 2 is a detailed schematic illustration of protection sectors in the non-volatile memory NVM of FIG. 1. For example, the non-volatile memory NVM has protection information memory sectors BPS, SPS and CLS, and the data protection information Sp includes first protection information, second protection information and protection selecting information respectively stored in the protection information memory sectors BPS, SPS and CLS.

In one example, the first and second protection information is respectively block protection information and sector protection information.

For example, the non-volatile memory NVM includes 128 memory sectors. The protection information memory sector BPS stores the block protection information with four bits of data. For example, when the block protection information has the values $(1000)_2$, $(0111)_2$, $(0110)_2$, $(0101)_2$, $(0100)_2$, $(0011)_2$, $(0010)_2$ and $(0001)_2$, the control circuit 20 correspondingly regards the whole 128 memory sectors, the former 64 memory sectors, the former 32 memory sectors, the former 16 memory sectors, the former 8 memory sectors, the former 4 memory sectors, the former 2 memory sectors and the first memory sector of the 128 memory sectors as the memory sector being protected. When the block protection information has the value $(0000)_2$, the control circuit 20 regards the 128 memory sectors as the memory sectors that are not protected.

In another example, the protection information memory sector SPS stores, for example, sector protection information with 128 bits of data respectively corresponding to the 128 memory sectors in the non-volatile memory NVM. When each of the 128 bits of data has the value 0, it represents that the memory sector corresponding to each bit of data is not being protected. When each of the 128 bits of data has the value 1, it represents that the memory sector corresponding to each bit of data is protected.

The control circuit 20 reads the protection selecting information to read one of the block protection information stored in the protection information memory sector BPS and the sector protection information stored in the protection information memory sector SPS. The control circuit 20 stores the read block protection information/sector protection information in the volatile memory 30. Thus, the control circuit 20 can protect the data stored in the non-volatile memory NVM according to the block protection information/the sector protection information stored in the volatile memory 30.

The data stored in the protection information memory sectors BPS, SPS and CLS of the non-volatile memory NVM are programmable. Thus, the user can selectively protect the data stored in the non-volatile memory NVM by way of sector protection or block protection by editing the information stored in the protection information memory sectors BPS, SPS and CLS.

The control circuit 20 further performs the data programming and reading operations on the non-volatile memory NVM and the volatile memory 30 in response to an input command Cmd.

In one operation example, the control circuit 20 modifies the data protection information stored in the volatile memory 30 in response to a temporary modification command. Thus, the control circuit 20 can protect the data stored in the non-volatile memory NVM according to the modified data protection information stored in the volatile memory 30.

In another operation example, the control circuit 20 performs a permanent modification operation on the data protection information stored in the non-volatile memory NVM in response to a permanent modification command. After the operation of modifying the information stored in the non-volatile memory NVM, the control circuit 20 provides the data protection information Sp, obtained after the permanent modification operation, to the volatile memory 30 through, for example, the circuits, such as the row decoder 42, the column decoder 44, the sense amplifier 46 and the address generator 48, and thus protects the data stored in the non-volatile memory NVM based on the permanent modified data protection information stored in the volatile memory 30.

Figure 3:
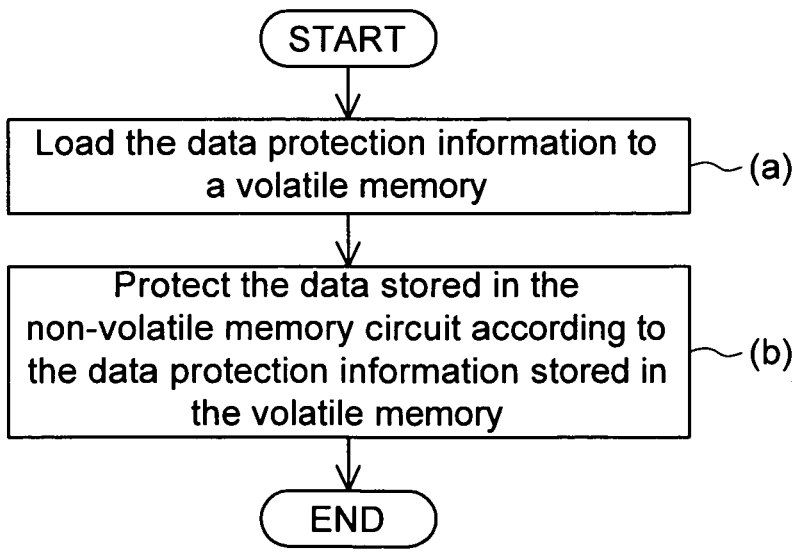
FIG. 3 is a flow chart showing a data protecting method according to the embodiment of the invention.

FIG. 3 is a flow chart showing a data protecting method according to the embodiment of the invention. First, as shown in step (a), the control circuit 20 loads the data protection information Sp stored in the non-volatile memory NVM to the volatile memory 30. Thereafter, as shown in step (b), the control circuit 20 protects the data stored in the non-volatile memory NVM according to the data protection information stored in the volatile memory 30.

Figure 4:
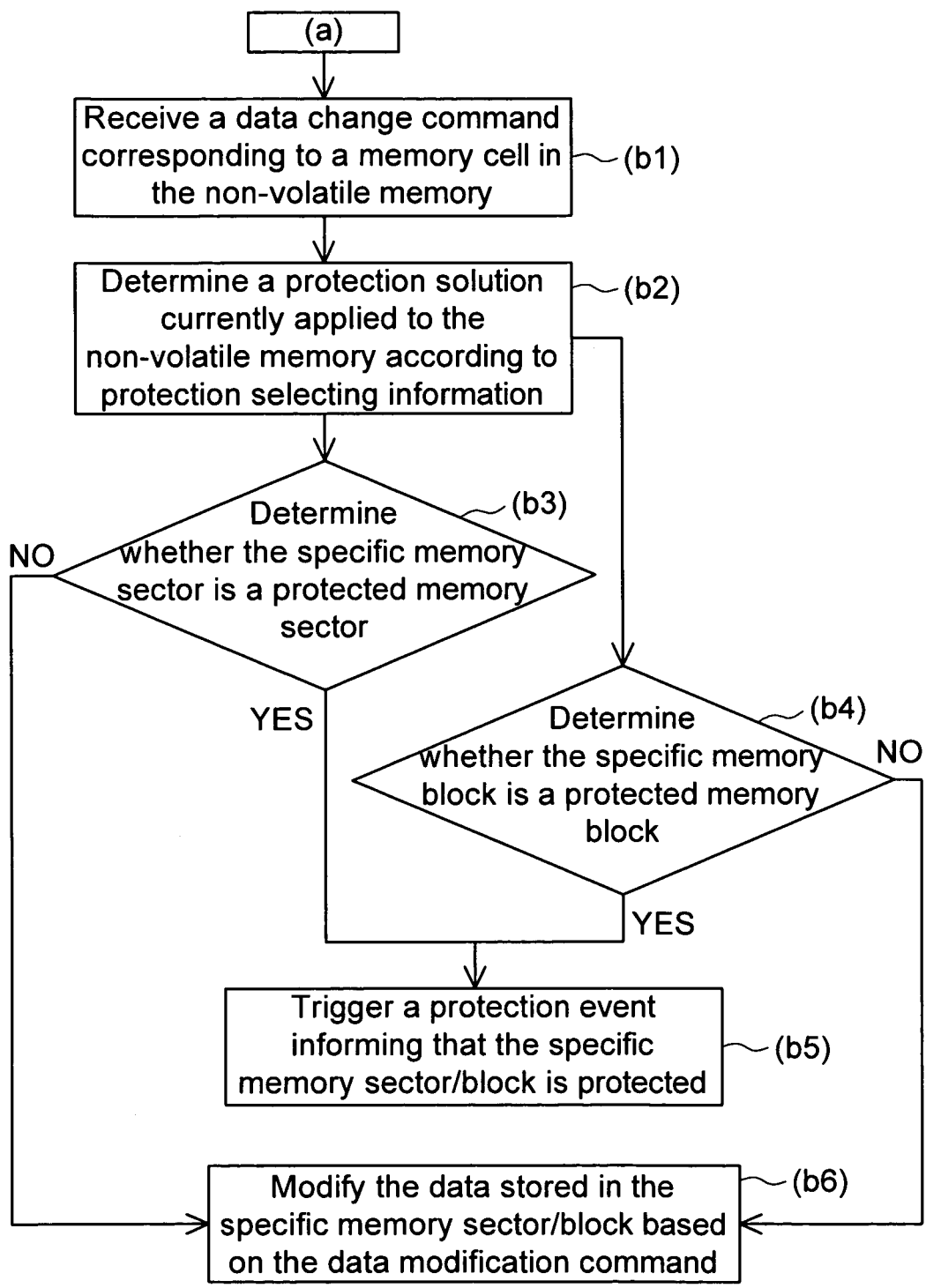
FIG. 4 is a detailed flow chart showing the step (b) of FIG. 3.

FIG. 4 is a detailed flow chart showing the step (b) of FIG. 3. In one example, the step (b) includes steps (b1) to (b4). As shown in the step (b1), the control circuit 20 receives the data change command, which corresponds to one specific memory sector in the non-volatile memory NVM, for example.

Next, as shown in the step (b2), the control circuit 20 determines the protection solution currently applied to the non-volatile memory NVM according to the protection selecting information stored in the corresponding volatile memory 30. If the protection solution currently applied to the non-volatile memory NVM is the sector protection, then the step (b3) is performed, and the control circuit 20 judges whether or not the specific memory sector is being protected according to the data protection information stored in the volatile memory 30 loaded from the data protection information stored in the protection information memory sector SPS of the non-volatile memory NVM. If yes, step (b5) is performed, and the control circuit 20 triggers the protection operation event to notify the user that the specific memory sector is being protected. If not, step (b6) is performed and the control circuit 20 changes the data stored in the specific memory sector in response to the data change command.

In another example, if the protection solution currently applied to the non-volatile memory NVM in the step (b2) is the block protection, then the step (b4) is performed, and the control circuit 20 judges whether or not the specific memory block is being protected according to the data protection information stored in the volatile memory 30 loaded from the data protection information stored in the protection information memory sector BPS of the non-volatile memory NVM. If yes, step (b5) is performed, and the control circuit 20 triggers the protection operation event to notify the user that the specific memory block is being protected. If not, step (b6) is performed and the control circuit 20 changes the data stored in the specific memory block in response to the data change command.

Figure 5:
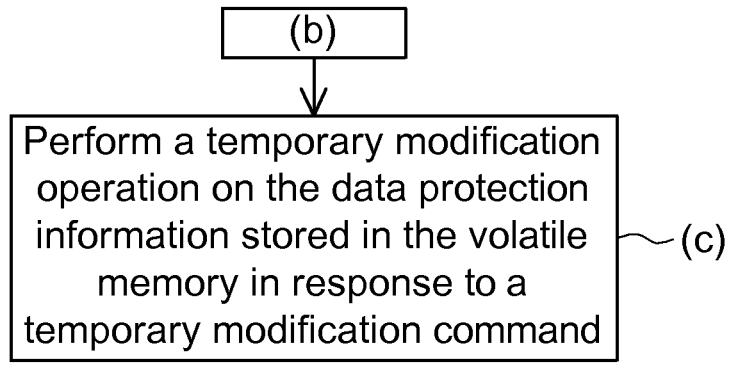
FIG. 5 is a partial flow chart showing the data protecting method according to the embodiment of the invention.

The data protecting method of this embodiment further includes, for example, the step (c), as shown in FIG. 5. In the step (c), the control circuit 20 performs a temporary modification operation on the data protection information stored in the volatile memory 30 in response to the temporary modification command. In an example, the data protection information further includes the protection selecting information. In one example, the step (c) is performed after the step (b) is performed.

Figure 6:
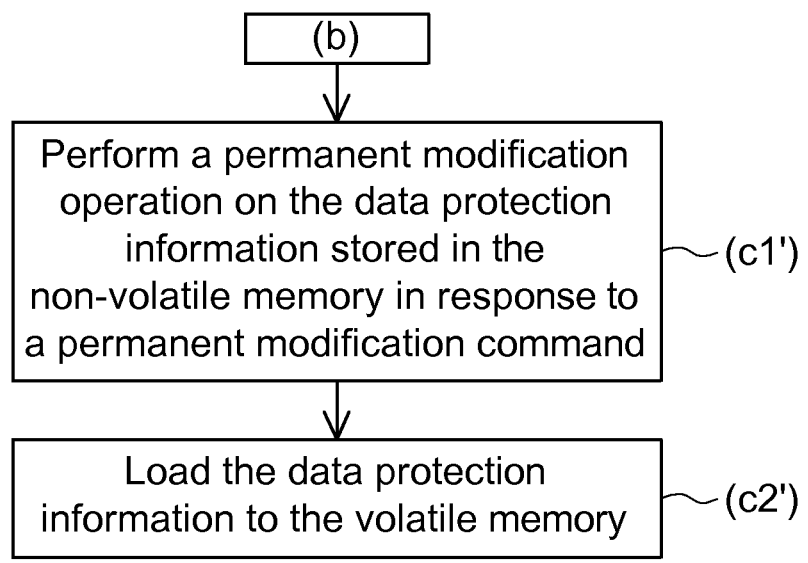
FIG. 6 is a partial flow chart showing the data protecting method according to the embodiment of the invention.

The data protecting method of this embodiment further includes, for example, steps (c1') and (c2'), as shown in FIG. 6. In the step (c1'), the control circuit 20 performs the permanent modification operation on the data protection information Sp stored in the non-volatile memory NVM in response to the permanent modification command. Next, in the step (c2'), the control circuit 20 loads the data protection information Sp, obtained after the permanent modification operation, into the volatile memory 30, and thus protects the data stored in the non-volatile memory NVM. In one example, the steps (c1') and (c2') are performed after the step (b) is performed.

The data protecting method of this embodiment protects the data stored in the non-volatile memory via the protection information stored in the volatile memory. The protection information stored in the volatile memory is loaded from the non-volatile memory. Thus, compared with the conventional protection method, the data protecting method of this embodiment has the advantages of effectively recording the protection information and preventing the non-volatile memory, which should be rewritten at the high frequency, from being damaged.

In addition, the data protecting method of this embodiment may further select one of the first and second data protection solutions as the data protection solution for the non-volatile memory by reading the protection selecting information stored in the non-volatile memory. The user may select one of the first and second data protection solutions more flexibly to protect the data stored in the non-volatile memory by programming the protection selecting information or temporarily changes protection selecting information stored in the volatile memory. Thus, compared with the conventional protection method, the data protecting method of this embodiment has the advantages of protecting the data stored in the non-volatile memory using different types of data protection solutions more flexibly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data protecting method for a memory, the memory comprising a volatile memory and a non-volatile memory for storing data and data protection information, the data protecting method comprising the steps of:
    loading the data protection information to the volatile memory from the non-volatile memory; and
    protecting the data stored in the memory according to the data protection information stored in the volatile memory.

2. The method according to claim 1, further comprising:
    performing a temporary modification operation on the data protection information and protection selecting information stored in the volatile memory in response to a temporary modification command.

3. The method according to claim 1, further comprising the step of:
    performing a permanent modification operation on the data protection information stored in the non-volatile memory in response to a permanent modification command.

4. The method according to claim 3, further comprising the step of:
    loading the data protection information, after the permanent modification operation is performed, to the volatile memory.

5. The method according to claim 2, wherein the step of protecting the data stored in the memory comprises:
    receiving a data change command corresponding to a memory cell in the memory;
    determining a protection solution currently applied to the memory according to the protection selecting information; and
    judging whether the memory cell is protected according to the data protection information stored in the volatile memory.

6. The method according to claim 5, further comprising:
    changing the data stored in the memory cell in response to the data change command when the memory cell is not being protected; and
    triggering an operation event when the memory cell is protected.

7. The method according to claim 5, wherein the protection selecting information indicates that the protection solution currently applied to the memory is one of a block protection solution and a sector protection solution.

8. A memory, comprising:
    a non-volatile memory for storing data and data protection information;
    a volatile memory for storing the data protection information loaded from the non-volatile memory; and
    a control circuit for loading the data protection information to the volatile memory,
    wherein the control circuit protects the data stored in the memory according to the data protection information stored in the volatile memory.

9. The memory according to claim 8, wherein the control circuit performs a temporary modification operation on the data protection information and protection selecting information stored in the volatile memory in response to a temporary modification command.

10. The memory according to claim 8, wherein the control circuit performs a permanent modification operation on the data protection information stored in the non-volatile memory in response to a permanent modification command.

11. The memory according to claim 10, wherein the control circuit further loads the data protection information, after the permanent modification operation is performed, to the volatile memory.

12. The memory according to claim 8, wherein the non-volatile memory comprises:
    a first protection data block for storing block protection information, wherein the control circuit performs a block protection operation on the memory in response to the block protection information;
    a second protection information block for storing sector protection information, wherein the control circuit performs a sector protection operation on the memory in response to the sector protection information; and
    a third protection information block for storing protection selecting information to indicate the control circuit to selectively read one of the block protection information and the sector protection information and performs a protection operation according to one of the block protection information and the sector protection information.

13. The memory according to claim 8, wherein the volatile memory is a SRAM.

* * * * *